(12) United States Patent
Benson

(10) Patent No.: US 7,770,842 B2
(45) Date of Patent: Aug. 10, 2010

(54) AIRCRAFT FLIGHT CONTROL SURFACE ACTUATION SYSTEM COMMUNICATION ARCHITECTURE

(75) Inventor: Dwayne M. Benson, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 943 days.

(21) Appl. No.: 11/207,250

(22) Filed: Aug. 19, 2005

(65) Prior Publication Data

US 2006/0043242 A1    Mar. 2, 2006

Related U.S. Application Data

(60) Provisional application No. 60/604,249, filed on Aug. 24, 2004.

(51) Int. Cl.
*B64C 13/00* (2006.01)

(52) U.S. Cl. ............ 244/75.1; 244/99.2; 244/212; 244/213; 244/214; 244/215; 701/3; 701/4

(58) Field of Classification Search ............ 244/75.1, 244/99.2, 175, 212–215; 701/3, 4
See application file for complete search history.

(56) References Cited

U.S. PATENT DOCUMENTS

| | | |
|---|---|---|
| 4,649,484 A | 3/1987 | Herzog et al. |
| 4,887,214 A | 12/1989 | Takats et al. |
| 5,274,554 A | 12/1993 | Takats et al. |
| 5,493,497 A * | 2/1996 | Buus ............................ 701/4 |
| 5,743,490 A * | 4/1998 | Gillingham et al. ........ 244/99.9 |
| 5,806,805 A | 9/1998 | Elbert et al. |
| 5,913,492 A | 6/1999 | Durandeau et al. |
| 6,076,767 A | 6/2000 | Farley et al. |
| 6,241,195 B1 | 6/2001 | Wagner, III |
| 6,299,108 B1 | 10/2001 | Lindstrom et al. |
| 6,349,900 B1 | 2/2002 | Uttley et al. |
| 6,382,566 B1 | 5/2002 | Ferrel et al. |
| 6,389,335 B1 | 5/2002 | Vos |
| 6,446,911 B1 | 9/2002 | Yount et al. |

(Continued)

FOREIGN PATENT DOCUMENTS

| | | |
|---|---|---|
| EP | 1061269 A2 | 12/2000 |
| EP | 1310848 A1 | 5/2003 |

OTHER PUBLICATIONS

PCT International Search Report PCT/US2005/030122, Dec. 20, 2005.

(Continued)

*Primary Examiner*—Timothy D Collins
*Assistant Examiner*—Philip J Bonzell
(74) *Attorney, Agent, or Firm*—Ingrassia Fisher & Lorenz, P.C.

(57) ABSTRACT

A flight control surface actuation system includes a plurality of smart actuators to move aircraft flight control surfaces between extended and retracted positions. The system includes a high availability network between the flight control avionics and the smart actuators, and between each of the smart actuators. The system configuration allows network nodes associated with each smart actuator to monitor and control one another, under higher level control of the aircraft flight control avionics, to provide multiple levels of health monitoring, control, and shutdown capability.

16 Claims, 3 Drawing Sheets

U.S. PATENT DOCUMENTS

| | | |
|---|---|---|
| 6,483,436 B1 | 11/2002 | Emaci et al. |
| 6,526,337 B2 | 2/2003 | Gardner |
| 6,622,972 B2 | 9/2003 | Urnes, Sr. et al. |
| 6,650,973 B2 * | 11/2003 | Yamamoto .................... 701/4 |
| 6,705,570 B1 | 3/2004 | Degenholtz et al. |
| 6,755,375 B2 | 6/2004 | Trikha |
| 6,776,376 B2 | 8/2004 | Collins |
| 6,827,311 B2 | 12/2004 | Wingett et al. |
| 6,860,452 B2 * | 3/2005 | Bacon et al. ............... 244/194 |
| 7,031,810 B2 * | 4/2006 | Foch et al. .................... 701/3 |
| 2003/0195673 A1 * | 10/2003 | Foch et al. .................... 701/3 |

OTHER PUBLICATIONS

D. Briere, T. Pascal; "Airbus A320/A330/A340 Electrical Flight Controls—A Family of Fault-Tolerant Systems," 1993, pp. 616-623.

J-CH Mare, "Commandes De Vol Hydrauliques: Une Evolution Vers LA Mecatronique," Dec. 1997, vol. 35, No. SPECIAL, pp. 6-8, 10.

* cited by examiner

AIRCRAFT FLIGHT CONTROL SURFACE ACTUATION SYSTEM COMMUNICATION ARCHITECTURE

CROSS-REFERENCES TO RELATED APPLICATIONS

This application claims the benefit of U.S. Provisional Application No. 60/604,249, filed Aug. 24, 2004.

TECHNICAL FIELD

The present invention relates to flight surface actuation and, more particularly, to the communication architecture for a flight control surface actuation system.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. In most instances, this movement is effected via actuators that are coupled to the flight control surfaces. Though unlikely, it is postulated that a flight control surface actuator could become inoperable. Thus, some flight control surface actuation systems are implemented with a plurality of actuators coupled to a single flight control surface.

In many flight control surface actuation systems the actuators are hydraulically powered. Some flight control surface actuation systems have been implemented, however, with other types of actuators, including pneumatic and electromechanical actuators. Additionally, in some flight control surface actuation systems, a portion of the actuators, such as those that are used to drive the flaps and slats, are driven via one or more central drive units and mechanical drive trains.

Although the flight control surface actuation systems that include hydraulic, pneumatic, and/or electromechanical actuators are generally safe, reliable, and robust, these systems do suffer certain drawbacks. Namely, these systems can be relatively complex, can involve the use of numerous parts, can be relatively heavy, and may not be easily implemented to provide sufficient redundancy, fault isolation, and/or system monitoring.

Hence, there is a need for a flight control surface actuation system that is less complex and/or is lighter than known systems and/or provides sufficient redundancy, fault isolation, and monitoring. The present invention addresses one or more of these needs.

BRIEF SUMMARY

The present invention provides a flight control surface actuation system that uses smart actuators, and includes a high availability network between the flight control avionics and the smart actuators and between each of the smart actuators. This configuration provides multiple levels of health monitoring, control, and shutdown capability.

In one embodiment, and by way of example only, an aircraft flight control system includes a plurality of independent communication channels, a flight control avionics channel, a plurality of actuators, and a plurality of remote electronic control units. The flight control avionics channel is operable to supply flight control surface position commands representative of a commanded flight control surface position via each of the independent communication channels. Each actuator is adapted to couple to an aircraft flight control surface, is coupled to receive actuator position commands, and is operable, upon receipt of the actuator position commands, to move to an actuator position corresponding to the commanded flight control surface position. The remote electronic control units are disposed remote from the flight control avionics, and each is associated with one of the plurality of actuators. Each remote electronic control unit is coupled to receive the flight control surface position commands supplied from each of the independent actuator control channels and is operable, in response thereto, to supply the actuator position commands to its associated actuator. Each remote electronic control unit is also coupled to receive one or more signals representative of operability of one or more of the plurality of actuators and one or more other remote electronic control units and is operable, in response thereto, to determine to whether one or more of the plurality of actuators are operating improperly and whether one or more of the other remote electronic control units are operating improperly.

In another exemplary embodiment, an aircraft flight control system includes a plurality of independent communication channels, a flight control avionics channel, a plurality of communication hubs, a plurality of remote electronic control units, and a plurality of actuators. The flight control avionics channel is operable to supply flight control surface position commands representative of a commanded flight control surface position via each of the independent communication channels. Each communication hub is coupled to receive the flight control surface position commands supplied from one of the independent channels and is operable to supply the received flight control surface position commands. Each remote electronic control unit is coupled to one of the communication hubs to receive the flight control surface position commands supplied therefrom, and is operable, upon receipt of the flight surface position commands, to supply actuator position commands. Each actuator is adapted to couple to an aircraft flight control surface, is coupled to receive the actuator position commands from one of the actuator control units, and is operable, upon receipt of the actuator position commands, to move to an actuator position corresponding to the commanded flight control surface position.

Other independent features and advantages of the preferred flight control surface actuation control system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
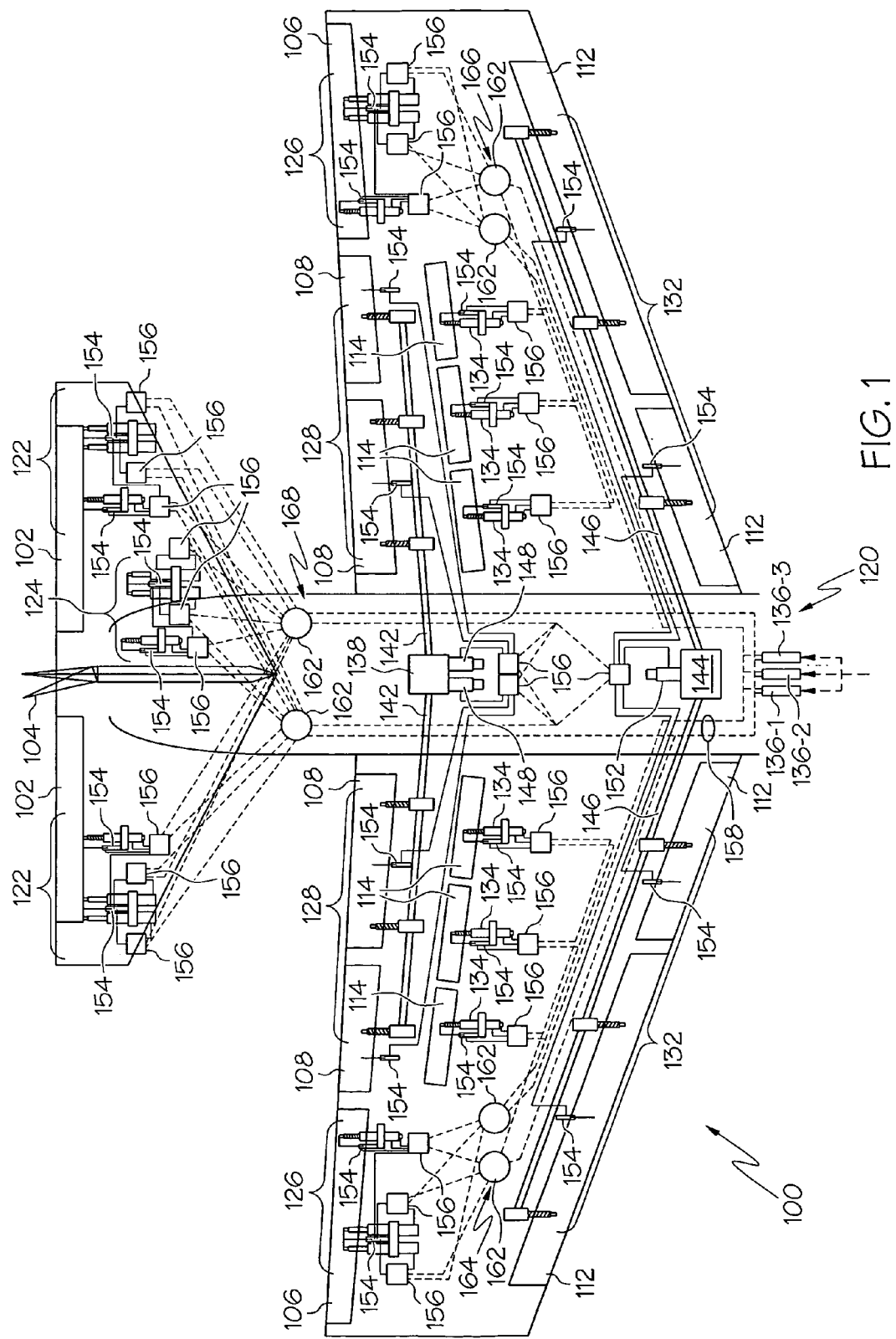
FIGS. 1-3 are each schematic diagrams of a portion of an exemplary aircraft depicting various alternative embodiments of a flight control surface actuation system according to the present invention.

Turning first to FIG. 1, a schematic diagram of a portion of an exemplary aircraft and a portion of an exemplary flight control surface actuation system is shown. In the illustrated embodiment, the aircraft 100 includes a pair of elevators 102, a rudder 104, and a pair of ailerons 106, which are the primary flight control surfaces, and a plurality of flaps 108, slats 112, and spoilers 114, which are the secondary flight control surfaces. The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved either by banking the aircraft or by varying the thrust levels from the engines on opposing sides of the aircraft 100. It is additionally noted that the aircraft 100, in some embodiments, could also include horizontal stabilizers. It will be appreciated that, for clarity and ease of depiction, none of the aircraft 100 depicted and described herein include horizontal stabilizers.

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend more steeply for a given airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

The flight control surfaces 102-114 are moved between retracted and extended positions via a flight control surface actuation system 120. The flight control surface actuation system 120 includes a plurality of primary flight control surface actuators, which include elevator actuators 122, rudder actuators 124, and aileron actuators 126, a plurality of secondary control surface actuators, which include flap actuators 128, slat actuators 132, and spoiler actuators 134, and a plurality of flight control avionics (FCA) channels channels 136. It will be appreciated that the number of channels of FCA channels channels 136 may vary. However, in the depicted embodiment, the flight control surface actuation system 120 includes three channels of FCA channels 136 (channels 136-1, channels 136-2, channels 136-3).

Figure 2:
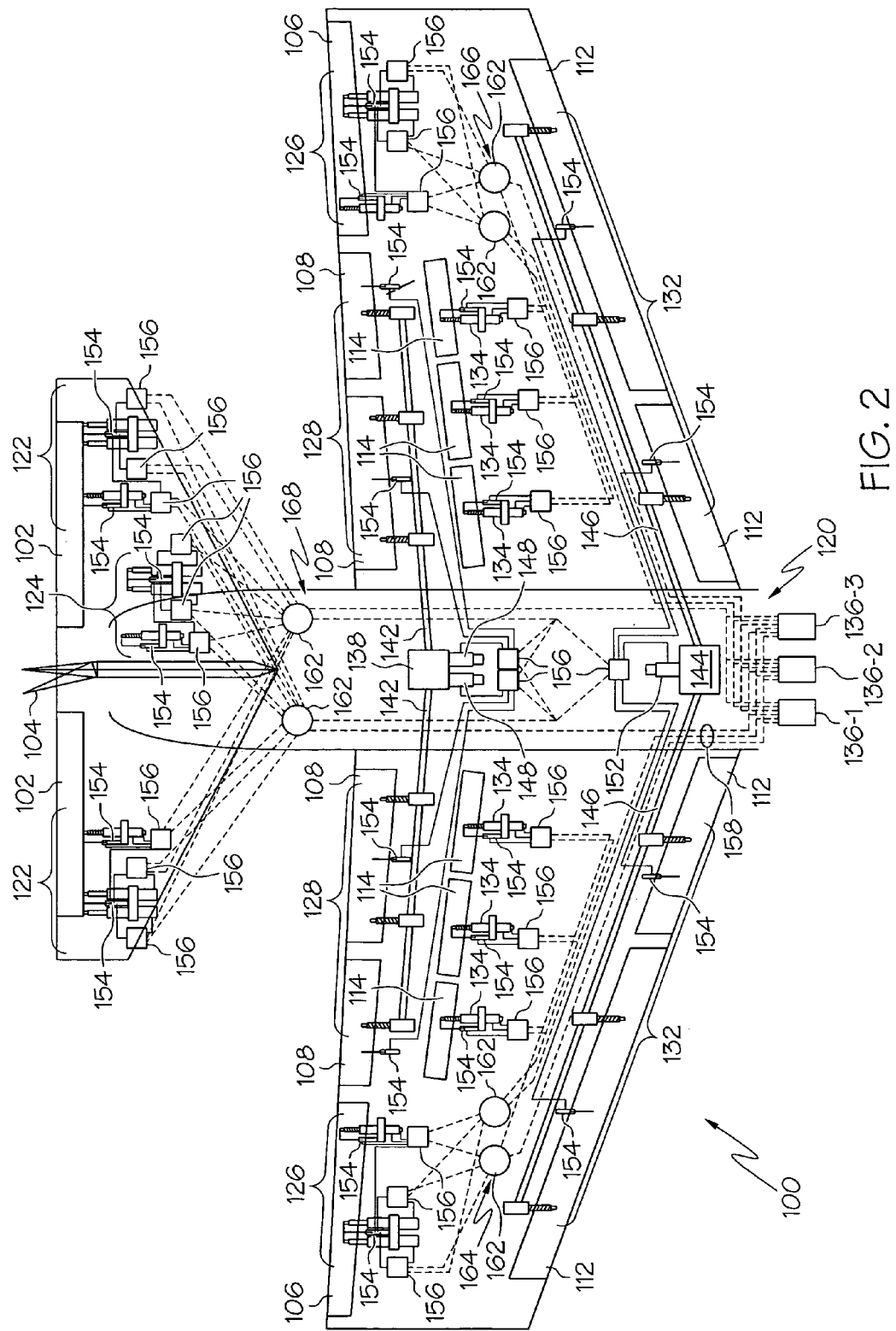

The system 120 and FCA channels 136 may be implemented according to any one of numerous operational configurations. For example, the system 120 could be configured such that two of the channels channels 136-1, channels 136-2 are active channels, while the remaining channel channels 136-3 is in an inactive (or standby) mode. In the depicted embodiment, however, the system 120 is configured such that all three channels 136-1, 136-2, 136-3 are active. It will additionally be appreciated that the number of independent communication channels per FCA channels 136 may vary. For example, in the embodiment depicted in FIG. 1, each FCA channel 136 is implemented with two independent communication channels. However, as shown in FIG. 2, each FCA channel 136 could instead be implemented with six independent communication channels.

The FCA channels 136 are each adapted to receive commands from one or more non-illustrated external systems, such as an autopilot or pilot controls. In response to the received commands, the FCA channels 136 each supply appropriate flight control surface position commands, via each of the independent communication channels. As will be described further below, the flight control surface position commands cause the flight control surface actuators 122-134 to move the appropriate flight control surfaces 102-114 to the commanded flight control surface position.

The flight control surface actuation system 120 may also be implemented using various numbers of flight control surface actuators 122-134. In addition, the number of flight control surface actuators 122-134 per flight control surface 102-114 may be varied. In the embodiment shown in FIG. 1, however, the system 120 is implemented such that three primary flight control surface actuators 122-126 are coupled to each primary flight control surface 102-106, and either one or two secondary control surface actuators 128-134 are coupled to each secondary control surface 108-114 depending, for example, on the size of the control surface.

The system 120 may additionally be implemented using various types of flight control surface actuators 122-134. For example, in the depicted embodiment, the primary control surface actuators 122-126 are implemented using a pair of hydraulic linear actuators and a single electromechanical linear actuator. The system 120 is configured such that the hydraulic actuators are both normally-active actuators and the electromechanical actuators are standby actuators.

The secondary control surface actuators 128-134 are also preferably linear-type actuators. However, in the depicted embodiment, the flap actuators 128 are driven by a flap central drive unit 138 via a plurality of interconnecting drive mechanisms 142, the slat actuators 132 are driven by a slat central drive unit 144 via a plurality of interconnecting drive mechanisms 146, and the spoiler actuators 134 are each individually-driven electromechanical actuators. It will be appreciated that the flap central drive unit 138 and the slat central drive unit 144 may be implemented as hydraulically-powered units, pneumatically-powered units, or electrically-powered units. However, in the depicted embodiment, the flap central drive unit 138 is implemented as an electrically-powered, dual-motor 148 unit, and the slat central drive unit 144 is an electrically-powered, single-motor 152 unit. It will be appreciated that these types of flight control surface actuators 122-134 and drive units 138, 144 are merely exemplary of a particular embodiment, and that other types of actuators 122-134 and drive units 138, 144 could also be used.

The flight control surface actuation system 120 additionally includes a plurality of control surface position sensors 154. The control surface position sensors 154 sense the positions of the flight control surfaces 102-114 and supply control surface position feedback signals representative thereof. It will be appreciated that the control surface position sensors 154 may be implemented using any one of numerous types of sensors including, for example, linear variable differential transformers (LVDTs), rotary variable differential transformers (RVDTs), Hall effect sensors, or potentiometers, just to name a few. The control surface position sensors 154 may be coupled directly to a flight control surface, or to one or more control surface actuators, or to both, and may thus function as either control surface position sensors or actuator position sensors, or both. In the depicted embodiment, a single control surface position sensor 154 is coupled to each set of primary flight control surface hydraulic actuators, a single control surface position sensor 154 is coupled to each primary control surface electromechanical actuator and to each spoiler actuator, and a single control surface position sensor 154 is coupled to each flap and each slat. It will be appreciated, however, that this is merely exemplary of a particular embodiment and that more or less than this number of position sensors 154 could be used. Moreover, in other embodiments, the flight control surface actuation system 120 could be implemented without some, or all, of the control surface position sensors 154.

The flight control surface actuators 122-134 are each controlled by a remote electronic control unit (REU) 156. More specifically, at least in the depicted embodiment, one REU 156 is coupled to, and controls, each of the primary flight control surface actuators 122-126, each of the spoiler actuators 134, each of the flap central drive unit motors 148, and the slat central drive unit motor 152. The REUs 156 are each coupled to receive all, or selected ones, of the flight control surface position commands from each of the independent communication channels. The REUs 156 are additionally coupled to receive one or more control surface position feedback signals from one or more of the control surface position sensors 154. The REUs 156 are configured to implement local control logic and local loop closure. Thus, upon receipt of an appropriate flight control surface position command, each REU 152 that is appropriately activated to do so will respond to the flight control surface commands and the control surface position feedback signals to supply appropriate actuator position commands to its associated actuator 122-126, 134, or central drive unit motor 148, 152. The REUs 156 additionally transmit data back to the FCA channels 136 representative, for example, of the flight control surface position to which the actuators were moved, thereby providing confirmation that the flight control surface was moved to the position commanded by the FCA channels 136.

At least some of the REUs 156, in addition to controlling the primary flight control surface actuators 122-126, the spoiler actuators 134, the flap central drive unit motors 148, and the slat central drive unit motor 152, are further configured to monitor and determine the operability of one or more other REUs 156 and/or one or more control surface actuators 122-134 and/or central drive unit motors 148, 152. More specifically, the REUs 156 are preferably configured such that the set of REUs 156 associated with a flight control surface implement shared monitoring functions and, in the event an associated actuator and/or REU 156 is either inoperable or operating erroneously, a shutdown of the affected REU 156 is implemented to prevent further automated operation of the affected REUs 156 actuator. It will be appreciated that the affected REU 156 may be shutdown in response to one or more signals supplied from one or more of the other REUs 156 or, as will be described in more detail further below, preferably in response to a signal supplied from one or more of the FCA channels 136.

To implement the monitor functionality, each REU 156 associated with a flight control surface, or set of flight control surfaces, has access to the data that are transmitted to and from each of the other REUs 156 that are associated with the same flight control surface. For example, each REU 156 associated with the aileron 106 on one wing has access to the data that is transmitted to and from the other REUs 156 associated with that same aileron 106, and similarly for the REUs 156 associated with the aileron 106 on the other wing, the REUs 156 associated with each of the elevators 102, the REUs 156 associated with the rudder 104, the REUs associated with the flaps 108, and the REUs 156 associated with the slats 112. It will be appreciated that this is merely exemplary of a particular embodiment and that, if desired, each REU 156 could have access to the data that are transmitted to and from various other, or all other, REUs 156.

With the above-described configuration, each REU 156 in an associated REU set receives and processes the flight control surface commands, for the associated flight control surface, that are supplied from each of the independent communication channels. For the REUs 156 associated with the primary flight control surfaces 102-106 and the flaps 108, each REU 156 in the associated REU sets also receives a control surface position feedback signal from one or more of the control surface position sensors 154 for the associated flight control surface. In addition, each REU 156 in an associated REU set accesses data representative of the operability of the other REUs 156 and/or associated actuators in the REU set. These data may include, for example, the data representative of the flight control surface position that each REU 156 transmits back to the FCA channels 136. It will be appreciated that additional or other data representative of REU and/or actuator operability may also be accessed.

The REUs 156 in an associated REU set, based on the signals and data each receives and accesses, determine the operability of the other REUs 156 and associated actuators in the REU set. If one or more REUs 156 or associated actuators are determined to be inoperable or operating erroneously, one or more of the other REUs 156 in the REU set supply an actuator fault signal to the FCA channels 136. The FCA channels 136, which are additionally configured to implement appropriate shutdown logic, determine whether to transmit an actuator disable signal to each REU 156 that was determined to be inoperable or operating erroneously. If this determination is in the affirmative, the FCA channels 136 transmit the actuator disable signal to each affected REU 156, causing each affected REU 156 to shutdown.

As was noted above, the system 120 is configured such that the primary control surface electromechanical actuators are preferably provided as standby actuators. Thus, if both hydraulic actuators on the same primary control surface 102-106 are determined to be inoperable or otherwise operating erroneously, the FCA channels 136 additionally supply an activation signal to the REU 156 of the appropriate electromechanical actuator. In response, the REU 156 would be activated to respond to appropriate flight control surface position commands and supply actuator position commands to the electromechanical actuator.

The data that are transmitted between the FCA channels 136 and each of the REUs 156 are transmitted via a high-integrity, multi-channel data bus 158. The data bus 158 may be implemented using any one of numerous types of protocols including, for example, a time-triggered protocol (TTP) data bus, a TDMA (time division multiple access) data bus, or various types of mixed-mode data buses such as, for example, an IEEE 1394 data bus, just to name a few.

The system 120 additionally includes a plurality of communication hubs 162 to provide an additional level of isolation. In the depicted embodiment, six communication hubs 162 are included, and are divided into three hub sets 164, 166, and 168. It will be appreciated, however, that more or less than this number of communication hubs 162 and/or hub sets 164-168 could be used. The communication hubs 162 are each coupled, via the data bus 158, between one of the independent communication channels and a plurality of served REUs 152. The communication hubs 162 in the first hub set 164 serve the REUs 156 for the aileron actuators 126 and the spoiler actuators 134 on one wing, and the communication hubs 162 in the second hub set 166 serve the REUs 156 for the aileron actuators 126 and the spoiler actuators 134 on the other wing. The communication hubs 162 in the third hub set 168 serve the REUs 156 for the elevator actuators 122, the rudder actuators 124, the flap central drive unit motors 148, and the slat center drive unit motor 152. It will be appreciated that this configuration is merely exemplary, and that other configurations could be implemented.

Figure 3:
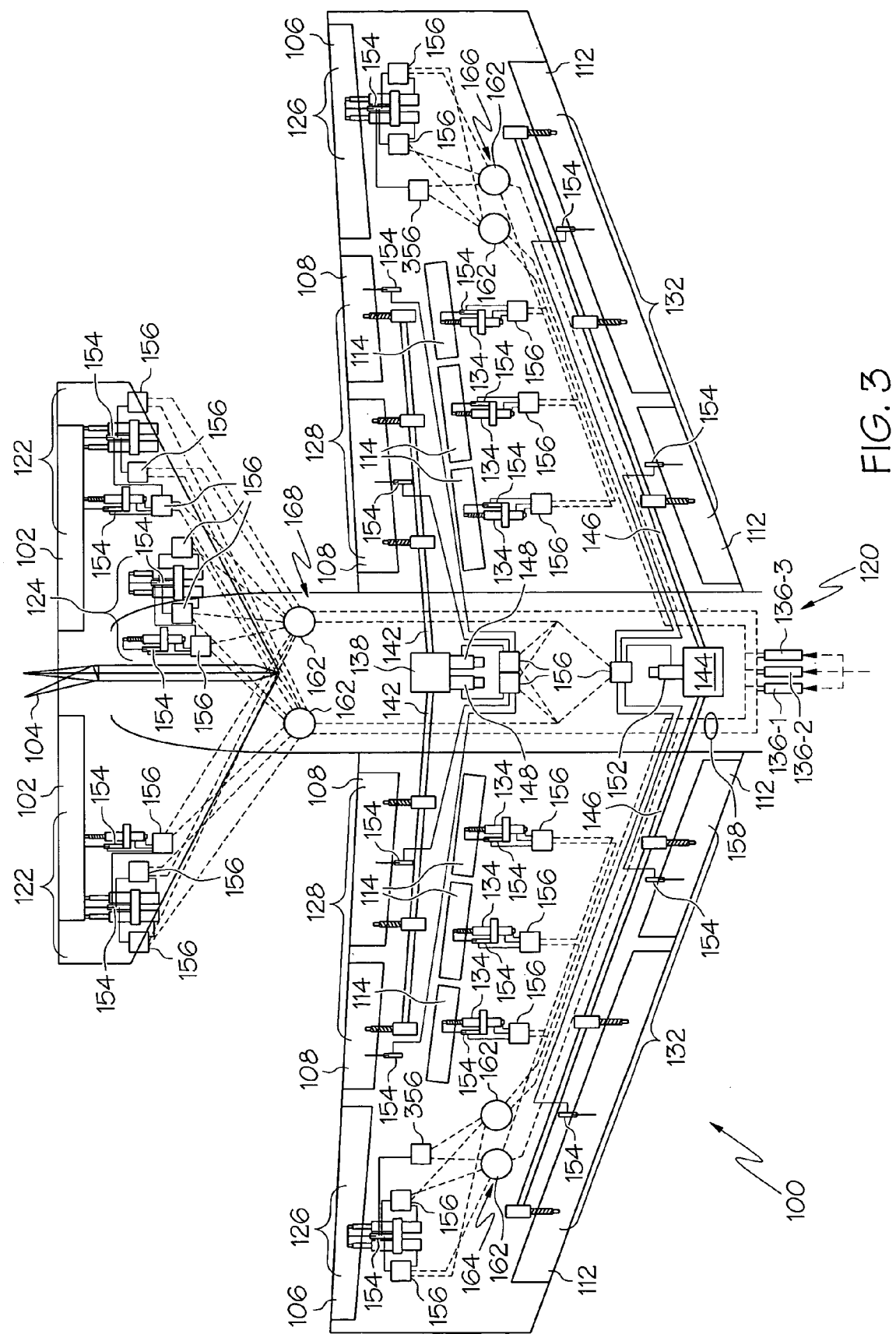

In the embodiments depicted in FIGS. 1 and 2 and described above, the flight control surface actuation system 120 is implemented such that each REU 156 is associated with an actuator. In an alternative embodiment, the system can be implemented such that one or more REUs 156 are not associated with an actuator, and function as monitor nodes. For example, in the alternative embodiment shown in FIG. 3, a monitor REU 356 is associated with each of the aileron actuators 126. The monitor REUs 356 function similar to the REUs 156 previously described, but are not associated with an actuator, and thus will not generate actuator position commands. It will be appreciated that the embodiment shown in FIG. 3 is merely exemplary, and that the monitor REUs 356 need not replace the aileron electromechanical actuator REUs 156. Moreover, additional monitor REUs 356 could be included at various other points in the system 120. For example, monitor REUs 356 could be associated with each of the elevator actuators 122 and/or the rudder actuators 124, if so desired.

In each of the embodiments described thus far, the REUs 156, 356, upon determining that one or more REUs 156 and/or actuators are inoperable or otherwise operating erroneously, supply actuator fault signals to the FCA channels 136. The FCA channels 136 in turn supply, if appropriate, an actuator shutdown signal to the affected REUs 156. It will be appreciated, however, that the REUs 156, 356 could instead be configured to supply the actuator shutdown signals directly to the affected REUs 156.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An aircraft flight control system, comprising:
a plurality of independent communication channels;
a flight control avionics channel operable to supply flight control surface position commands representative of a commanded flight control surface position via each of the independent communication channels;
a plurality of actuators, each actuator adapted to couple to an aircraft flight control surface, each actuator coupled to receive actuator position commands and operable, upon receipt thereof, to move to an actuator position corresponding to the commanded flight control surface position; and
a plurality of remote electronic control units disposed remote from the flight control avionics channel; and
a plurality of communication hubs, each communication hub coupled to only one of the plurality of independent communication channels and independently coupled to each of a plurality of the remote electronic control units,
wherein each remote electronic control unit is associated with a single one of the plurality of actuators and independently associated with each of a plurality of communication hubs, whereby all communications between one remote electronic control unit and another remote electronic control unit are via one or more of the communication hubs, and all communication between a remote electronic control unit and the flight control avionics channel are via one or more of the communication hubs, and
wherein each remote electronic control unit is:
(i) coupled to receive flight control surface position commands supplied from each of the independent communication channels, via a plurality of the communication hubs, and operable, in response thereto, to supply appropriate actuator position commands to its associated actuator, and
(ii) coupled to receive one or more signals representative of operability of one or more of the plurality of actuators and, via one or more of the communication hubs, one or more signals representative of operability of one or more other remote electronic control units and operable, in response thereto, to (i) determine whether one or more of the plurality of actuators are operating improperly and whether one or more of the other remote electronic control units are operating improperly and (ii) upon determining that one or more of the plurality of actuators are operating improperly or that one or more of the other remote electronic control units are operating improperly, to supply an actuator fault signal to one or more of the communication hubs.

2. The system of claim 1, wherein:
the flight control avionics channel is coupled to receive the actuator fault signals supplied from each of the remote electronic control units and is further operable, upon receipt thereof, to selectively supply an actuator disable signal to one or more of the remote electronic control units; and
each remote electronic control unit is further operable, upon receipt of an actuator disable signal, to disable its associated actuator.

3. The system of claim 1, further comprising:
second and third flight control avionic channels each coupled to a plurality of independent communication channels and each operable to supply flight control surface position commands via each of the independent communication channels.

4. The system of claim 1, wherein the one or more signals representative of operability include one or more of an actuator position signal and a flight surface position signal.

5. The system of claim 1, further comprising:
a plurality of monitor electronic control units disposed remote from the flight control avionics channel, each monitor electronic control unit associated with at least two of the plurality of remote electronic control units, each monitor electronic control unit coupled to receive:

(i) the flight control surface position commands supplied to its associated remote electronic control units, and (ii) a signal representative of operability of its associated actuators and remote electronic control units and operable, in response thereto, to determine to whether one or more of its associated actuators are operating improperly and whether one or more of its associated remote electronic control units are operating improperly.

6. The system of claim 5, wherein each monitor electronic control unit is further operable, upon determining that one or more of it associated actuators are operating improperly or that one or more of its associated remote electronic control units are operating improperly, to supply an actuator fault signal.

7. The system of claim 6, wherein:

the flight control avionics channel is coupled to receive the actuator fault signals supplied from each of the monitor electronic control units and is further operable, upon receipt thereof, to selectively supply an actuator disable signal to one or more of the remote electronic control units; and each remote electronic control unit is further operable, upon receipt of an actuator disable signal, to disable its associated actuator.

8. The system of claim 7, wherein:

the flight control avionics is further operable, upon receipt of the actuator fault signals, to selectively supply an actuator enable signal to one or more standby remote electronic control units; and each standby remote electronic control unit is further operable, upon receipt of an actuator enable signal, to supply the actuator position commands in response to the flight control surface position commands received thereby.

9. The system of claim 8, further comprising:

a plurality of standby actuators adapted to couple to an aircraft flight control surface, each standby actuator coupled to receive the actuator position commands supplied from an enabled remote electronic control unit and operable, upon receipt thereof, to move to an actuator position corresponding to the commanded flight control surface position.

10. The system of claim 1, further comprising:

a plurality of actuator position sensors, each actuator position sensor operable to sense a position of one or more actuators and to supply an actuator position signal representative thereof, wherein each remote electronic control unit is coupled to receive at least one of the actuator position signals.

11. The system of claim 10, wherein the one or more signals representative of operability include the actuator position signals.

12. The system of claim 1, further comprising:

a plurality of flight control surface position sensors, each flight control surface position sensor adapted to sense a position of a flight control surface and to supply a flight control surface position representative thereof, wherein each remote electronic control unit is coupled to receive at least one of the flight control surface position signals.

13. The system of claim 12, wherein the one or more signals representative of operability include the flight control surface position signals.

14. An aircraft flight control system, comprising:

a plurality of independent communication channels;

a flight control avionics channel operable to supply flight control surface position commands representative of a commanded flight control surface position via each of the independent communication channels;

a plurality of communication hubs, each communication hub having a plurality of ports, each communication hub coupled to receive the flight control surface position commands supplied from only one of the independent communication channels and operable, upon receipt thereof, to supply the received flight control surface position commands;

a plurality of remote electronic control units, each of the remote electronic control units independently coupled to each of a plurality of the communication hubs to independently receive flight control surface position commands supplied therefrom, each of the remote electronic control units operable, upon receipt of the flight surface position commands it receives, to supply actuator position commands; and a plurality of actuators, each actuator adapted to couple to an aircraft flight control surface, each actuator coupled to receive the actuator position commands from only one of the remote electronic control units and operable, upon receipt thereof, to move to an actuator position corresponding to the commanded flight control surface position, wherein each of the remote electronic control units is further coupled to receive one or more signals representative of operability of one or more of the plurality of actuators and, via one or more of the communication hubs, one or more signals representative of operability of one or more other remote electronic control units and is further operable, in response thereto, to (i) determine whether one or more of the plurality of actuators are operating improperly and whether one or more of the other remote electronic control units are operating improperly and (ii) upon determining that one or more of the plurality of actuators are operating improperly or that one or more of the other remote electronic control units are operating improperly, to supply an actuator fault signal to one or more of the communication hubs.

15. The system of claim 14, wherein:

the flight control avionics is coupled to receive the actuator fault signals supplied from each of the remote electronic control units and is further operable, upon receipt thereof, to selectively supply an actuator disable signal to one or more of the remote electronic control units; and each remote electronic control unit is further operable, upon receipt of an actuator disable signal, to disable its associated actuator.

16. The system of claim 14, further comprising:

a plurality of monitor electronic control units disposed remote from the flight control avionics channel, each monitor electronic control unit associated with at least two of the plurality of remote electronic control units, each monitor electronic control unit coupled to receive:

(i) the flight control surface position commands supplied to its associated remote electronic control units, and (ii) a signal representative of operability of its associated actuators and remote electronic control units and operable, in response thereto, to determine to whether one or more of its associated actuators are operating improperly and whether one or more of its associated remote electronic control units are operating improperly.

* * * * *